United States Patent
Pawlowicz et al.

(10) Patent No.: US 12,498,417 B2
(45) Date of Patent: Dec. 16, 2025

(54) CONTRAST-ENHANCING STAINING SYSTEM AND METHOD AND IMAGING METHODS AND SYSTEMS RELATED THERETO

(71) Applicant: TECHINSIGHTS INC., Ottawa (CA)

(72) Inventors: Christopher Pawlowicz, Ottawa (CA); Spyridon Ntais, Ottawa (CA)

(73) Assignee: TECHINSIGHTS INC., Ottawa (CA)

( * ) Notice: Subject to any disclaimer, the term of this patent is extended or adjusted under 35 U.S.C. 154(b) by 581 days.

(21) Appl. No.: 18/007,716

(22) PCT Filed: Jun. 1, 2021

(86) PCT No.: PCT/CA2021/050740
§ 371 (c)(1),
(2) Date: Dec. 1, 2022

(87) PCT Pub. No.: WO2021/243447
PCT Pub. Date: Dec. 9, 2021

(65) Prior Publication Data
US 2023/0273256 A1    Aug. 31, 2023

(30) Foreign Application Priority Data
Jun. 2, 2020   (CA) ................................ CA 3082211

(51) Int. Cl.
*G01R 31/28*      (2006.01)
*G01N 23/2251*    (2018.01)
*H01L 23/14*      (2006.01)

(52) U.S. Cl.
CPC ..... *G01R 31/2898* (2013.01); *G01N 23/2251* (2013.01); *H01L 23/147* (2013.01); *G01N 2223/6116* (2013.01)

(58) Field of Classification Search
CPC .............. G01R 31/2898; G01R 31/307; G01R 31/311; G01N 23/2202; G01N 23/2251;
(Continued)

(56) References Cited

U.S. PATENT DOCUMENTS

| 4,942,113 A |   | 7/1990 | Trundle |
| 5,851,925 A | * | 12/1998 | Beh .......................... G01N 1/32 |
|   |   |   | 438/712 |

(Continued)

FOREIGN PATENT DOCUMENTS

| EP | 0110165 B1 | 6/1993 |
| GB | 2428885 A  | 2/2007 |

OTHER PUBLICATIONS

International Search Report for PCT Application PCT/CA2021/050740 dated Sep. 9, 2021, 4pages.
(Continued)

*Primary Examiner* — Jason L Mccormack
(74) *Attorney, Agent, or Firm* — KNOBBE, MARTENS, OLSON & BEAR, LLP

(57) ABSTRACT

Described are various embodiments of a contrast-enhancing staining system and method. In one embodiment, a method is described for enhancing contrast in an image of a substrate surface between regions of said substrate having different charge carrier characteristics. The method comprises exposing said substrate to a staining precursor comprising an oxidant; directing microwave electromagnetic radiation at the substrate, said microwave electromagnetic radiation enhancing a reaction rate of said oxidant reacting into a deposition material, said reaction rate being related to the charge carrier characteristics of a proximal region; and acquiring an image of said substrate surface indicating a
(Continued)

visual contrast between each of said regions based on differential deposition of the deposition material therebetween.

26 Claims, 11 Drawing Sheets

(58) Field of Classification Search
CPC .......... G01N 2223/6116; H01L 23/147; H01J 37/00; H01J 37/02; H01J 37/26; H01J 37/28
USPC .......................................... 250/306, 307, 311
See application file for complete search history.

(56) References Cited

U.S. PATENT DOCUMENTS

| | | |
|---|---|---|
| 2008/0068707 A1* | 3/2008 | Goodman .............. G02B 21/34 359/368 |
| 2008/0073527 A1* | 3/2008 | Nakazawa ............ H01J 37/226 250/307 |
| 2008/0296144 A1 | 12/2008 | Strouse et al. |
| 2009/0173938 A1 | 7/2009 | Honda et al. |

OTHER PUBLICATIONS

Written Opinion for PCT Application PCT/CA2021/050740 dated Sep. 9, 2021, 6 pages.

\* cited by examiner

CONTRAST-ENHANCING STAINING SYSTEM AND METHOD AND IMAGING METHODS AND SYSTEMS RELATED THERETO

RELATED APPLICATION

The instant application is the U.S. National Phase Application under 35 U.S.C. § 371 of International Application No. PCT/CA2021/050740, filed Jun. 1, 2021, which is related to and claims benefit of priority to Canadian Patent Application serial number: 3,082,211 entitled "CONTRAST-ENHANCING STAINING SYSTEM AND METHOD AND IMAGING METHODS AND SYSTEMS RELATED THERETO" and filed Jun. 2, 2020, the disclosure of which is fully incorporated herein by reference.

FIELD OF THE DISCLOSURE

The present disclosure relates to enhancing the doping contrast of an integrated circuit semiconductor substrate, and, in particular, to a contrast-enhancing staining system and method and imaging methods and systems related thereto.

BACKGROUND

The technological revolution of the late $20^{th}$ and early $21^{st}$ century has put a premium on competitive corporate intelligence. Companies, especially those involved in high tech, seek to determine what their competitors are putting in their latest products. To this end, integrated circuits, especially high value, cutting edge, microchips are constantly being reverse engineered, analyzed, and dissected to determine what are their internal structures and interconnections.

Currently, the dissection and analysis of integrated circuits involves a painstaking, laborious process. Each layer in a multi-layer microchip is carefully exposed and imaged/photographed. A mosaic of the images is then created and the traces are then laboriously traced to determine which feature is interconnected with which component.

Integrated microchips are generally substantially comprised of a semiconductor material, usually silicon (but also InAs, GaAs, InP, etc.), wherein different regions or portions have different doping characteristics and hence charge carrier characteristics. Doping of a semiconductor subs for example by the addition of a small percentage of foreign atoms in the regular crystal lattice of the semiconductor to produce dramatic changes in its electrical properties, thereby producing a doped semiconductor region or portion. For example, p-type (p-doped) silicon is created by the addition of trivalent impurities such as boron, aluminum or gallium to an intrinsic semiconductor that creates deficiencies of valence electrons, called "holes." Similarly, n-type (n-doped) silicon is made with the addition of pentavalent impurities such as antimony, arsenic or phosphorus that contributes free electrons.

One such challenge when reverse engineering the circuitry of an integrated microchip layers is differentiating between different semiconductor regions or portions with respect to their doping characteristics acquiring images of the semiconductor surface. For example, transistor-like devices embedded within ICs often comprise differently doped regions interfacing with one another. Identifying these devices is difficult without being able to clearly differentiate between differently doped regions when acquiring images thereof.

While some imaging methods, for example scanning electron microscopy (SEM) images of secondary electrons, may in some cases be used to differentiate between these differently doped regions (e.g. so-called doping contrast), this only works at low accelerating voltages, which are generally much lower than those used to image IC layers.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a contrast-enhancing staining system and method and imaging methods and systems related thereto that overcome some of the drawbacks of known techniques, or at least, provides a useful alternative thereto.

In accordance with one aspect, there is provided a method for enhancing contrast in an image of a substrate surface between regions of said substrate having different charge carrier characteristics, the method comprising: exposing said substrate to a staining precursor comprising an oxidant; directing microwave electromagnetic radiation at the substrate, said microwave electromagnetic radiation enhancing a reaction rate of said oxidant reacting into a deposition material, said reaction rate being related to the charge carrier characteristics of a proximal region; and acquiring an image of said substrate surface indicating a visual contrast between each of said regions based on differential deposition of the deposition material therebetween.

In one embodiment of the method, the charge carrier characteristics comprise one or more of a type of charge carrier, a concentration of charge carrier, or a type of dopant.

In one embodiment of the method, the reaction is a reduction reaction.

In one embodiment of the method, the deposition material is a metallic material and said staining precursor is a metal salt solution, said metal salt solution comprising at least one solvent and a concentration of cations of said metallic material.

In one embodiment of the method, the solvent comprises at least in part water.

In one embodiment of the method, the solvent comprises at least in part an organic solvent.

In one embodiment of the method, the metallic material is copper, silver, gold, aluminum, platinum, lead, palladium, zinc, nickel, or iron.

In one embodiment of the method, the substrate is a semiconductor substrate.

In one embodiment of the method, the semiconductor substrate is a silicon substrate.

In one embodiment of the method, the semiconductor substrate is a compound semiconductor substrate.

In one embodiment, the compound semiconductor substrate is GaAs, InAs, or InP.

In one embodiment of the method, the acquiring is performed with a scanning electron microscope (SEM).

In one embodiment of the method, the acquiring is performed with an optical microscope.

In accordance with another aspect, there is provided an image acquisition system for acquiring an image of an semiconductor substrate showing enhanced contrast between two or more regions of said substrate having different charge carrier characteristics, the system comprising: a staining material source configured to provide a staining material precursor solution comprising an oxidant for contacting the surface of said substrate; a microwave electromagnetic radiation source configured to direct microwave electromagnetic radiation at the semiconductor substrate, said microwave electromagnetic radiation enhancing a reaction rate of said oxidant reacting into a deposition material, said reaction rate being related to the charge carrier characteristics of a proximal region; and an image acquisition device sensitive to the amount of said staining precursor and configured to acquire an image of the substrate.

In one embodiment of the system, the charge carrier characteristics comprise one or more of a type of charge carrier, a concentration of charge carrier, or a type of dopant.

In one embodiment of the system, the reaction is a reduction reaction.

In one embodiment of the system, the deposition material is a metallic material and said staining precursor comprises a metal salt solution, said metal salt solution comprising at least one solvent and a concentration of cations of said metallic material.

In one embodiment of the system, the solvent comprises at least in part water.

In one embodiment of the system, the solvent comprises at least in part an organic solvent.

In one embodiment of the system, the metallic material copper, silver, gold, aluminum, platinum, lead, palladium, zinc, nickel, or iron.

In one embodiment of the system, the substrate is a semiconductor substrate.

In one embodiment of the system, the semiconductor substrate is a silicon substrate.

In one embodiment of the system, the semiconductor substrate is a compound semiconductor substrate.

In one embodiment of the system, the compound semiconductor substrate is GaAs, InAs, or InP.

In one embodiment of the system, the image acquisition device is a scanning electron microscope (SEM).

In one embodiment of the system, the image acquisition device is an optical microscope.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1A:
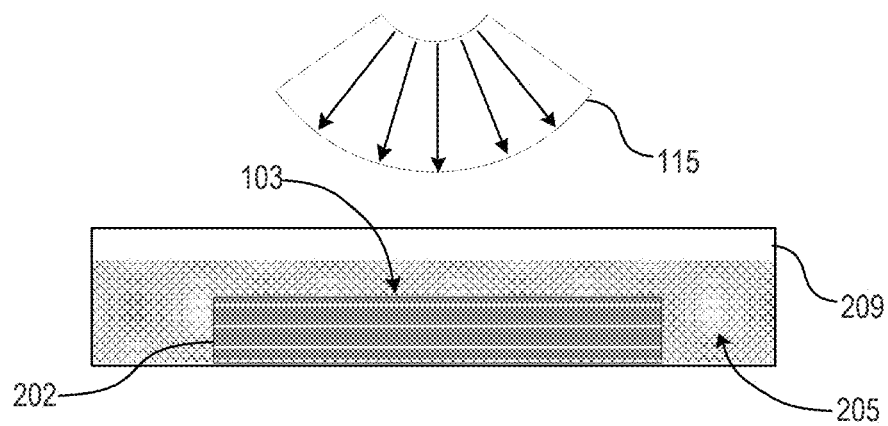
FIGS. 1A and 1B are schematic diagrams of a contrast-enhancing deposition method, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The systems and methods described herein provide, in accordance with different embodiments, different examples in which methods and systems are used to introduce differential deposition of a staining agent or material on a substrate, said differential deposition being sensitive to the doping or charge carrier characteristics of different regions or portions of the substrate's surface, to enhance or improve contrast between these regions or portions when subsequently acquiring an image of said semiconductor substrate's surface using downstream imaging techniques.

According to some embodiments of the invention, the substrate may be, at least in part, a semiconductor substrate being imaged for example in the context of reverse engineering the circuitry of an integrated circuit (IC). This may comprise delayering an IC layer by layer, for example with an ion beam mill, to expose the circuitry or circuit connections on the surface of each layer. Upon delayering the device, pictures, images or other representation (e.g. circuit schematic model based on data representative of detected surface features) may be taken of each layer of the substrate, thereby, capturing the circuitry or circuit connections on the surface of each layer. By piecing together the pictures, images, or other representations of the different layers, using appropriate software tools, circuit connections between the various components that may be inherent within a device, both across and between layers, can be produced. The process may be repeated for various devices within a larger device and a hierarchical schematic of the circuit connections of the various devices within the larger device may be developed. Proprietary software tools may also be used to produce hierarchical circuit schematics. Such circuit schematics may be useful in identifying evidence of use of claim elements in the target device being delayered. Thus, in some embodiments, the systems and methods described herein may be applied to produce images having enhanced contrast between, for example, differently doped regions, in order to better determine any functionality of such regions, if any. For example, differentiating between n-doped or p-doped regions may facilitate the identification of any transistor-like devices (MOSFET, etc.).

In some embodiments, the substrate may be made up of a mixture of materials such as, but is not limited to, semiconductors, metals and dielectrics in varying shapes and structures.

In some embodiments, the imaging system or method used to acquire pictures or images of each exposed layer may be scanning electron microscopy (SEM), optical microscopy, or any imaging method known in the art which may be expected to be sensitive to the presence and amount of deposited staining material, as will be understood by the skilled technician.

According to some embodiments, the staining material may be comprised of a metallic material, which may be selectively or differentially deposited on a metallic, dielectric or semiconductor substrate using for example an electroless deposition process as a function of the doping or charge carrier characteristics of different regions thereof. Electroless deposition or plating of metals is used to form a coating of metallic layer on the surface of a substrate through chemical reduction of metal ions in a precursor or bath solution. The reduction of the metal ions is accomplished chemically by inclusion of a reducing agent in the solution, where deposition only takes place on catalytically active surfaces. This method eliminates the need for an external power source. Moreover, the deposition rate of the metallic ions may be strongly influenced by the doping characteristics or charge carrier characteristics of the substrate (e.g. for semiconductors, depositing preferentially on p-doped or n-doped regions, depending on the nature of the metal ion). For example, for electroless deposition of copper (Cu) on a semiconductor substrate such as silicon, it has been shown that the copper material is deposited preferentially on the n-doped regions or portions of a silicon substrate than on p-doped regions or portions. As will be further discussed below, this preferential deposition of copper may be leveraged to increase contrast between n-doped and p-doped regions when imaging the silicon substrate thereafter.

During the electroless deposition process, the substrate is submerged in an electroless bath which typically comprises a precursor aqueous solution of metal ions, complex agents, reducing agents and stabilizers, operating in specific metal ion concentration, temperature and pH ranges. The metal ions may be introduced in the solution by mixing a metal salt of the type M$^+$X$^-$ where M is a metal atom and X may be inorganic or organic compound. Typically, the rate of deposition and the properties of the deposited coating depend on a number of factors such as the type and concentrations of the reducing agent, stabilizer, pH, temperature of the bath solution, etc. Moreover, the precursor solution may be designed to deposit any noble or non-noble metals, including without limitation, copper, silver, gold, aluminum, platinum, lead, palladium, zinc, nickel, and iron, or any alloy thereof.

Typically, electroless deposition is sensitive to the free carrier characteristics of the substrate. Therefore, in the case of a semiconductor substrate like silicon, for example, the process may be sensitive to the doping characteristics of the semiconductor substrate, which controls the free carrier characteristics (e.g. if free electrons are available to feed the deposition reaction).

In some cases, autocatalytic redox reactions like electroless deposition may require or may be enhanced exposing the substrate and the solution to visible or UV light, thereby causing a photoelectric effect at the substrate surface which feeds the autocatalytic reaction. However, it has also been shown that some autocatalytic reactions may be enhanced by exposing the substrate and solution to microwave radiation (MWR) instead, thereby inducing thermal effects (such as selective heating, etc.) and/or non-thermal effects. This provides a novel way to increase or enhance the contrast between differently doped regions when acquiring an image of the semiconductor substrate. Indeed, in some embodiments, the method described herein uses MWR to cause or accelerate electroless deposition of metal ions on a semiconductor surface. This has the advantage of being a relatively rapid and inexpensive way of staining different regions of the substrate before imaging the surface. Since the deposition is sensitive to the doping or charge carrier characteristics of different regions of the substrate's surface, a corresponding differentiated deposition of the number/concentration of metallic nanoparticles nucleated on the surface is generated thereby causing a differentiated thickness of metallic material deposited thereon which may then be leveraged or used to enhance or improve contrast between areas or regions having different doping or charge carrier characteristics when imaging the semiconductor substrate using a number of imaging techniques.

Figure 1B:
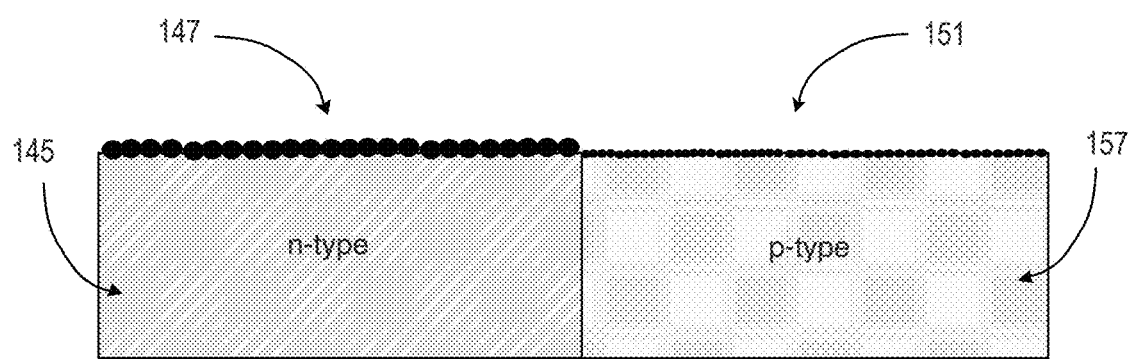

FIGS. 1A and 1B illustrates schematically such a process, according to one embodiment. FIG. 1A shows a substrate 102 (herein a semiconductor substrate for example) being submerged in a precursor solution 105 inside a container 109 while also being subjected to MWR 215 to drive or enhance the differential deposition of a staining material or agent thereon. Following such a procedure, FIG. 1B schematically illustrates how the staining agent or material is differentially deposited on different regions of herein the semiconductor substrate (e.g. n-doped region 145 or p-doped region 157), wherein in this example a large amount or thickness of staining material 147 is deposited on the n-doped region 145 compared to the amount deposited 151 on the p-doped region 157 (size not to scale).

Generally, what is meant by charge carrier characteristics is understood to refer to any quantitative parameter related to the presence and amount of a certain type (or types) of charge carriers in one or more regions of the substrate. This includes, without limitation, whether the substrate is a semiconductor, metallic or dielectric substrate, whether a semiconductor substrate is a doped semiconductor substrate (e.g. p-doped or n-doped), in which case the charge carrier characteristics are typically controlled via doping, the nature and quantity/concentration of the dopant atom (or atoms) used therein, the work function of the substrate, or any other material parameter which is known to influence how these regions may exchange electrons to drive a catalytic or autocatalytic reaction with the precursor solution's ions under MWR, which may in turn influence how much staining material is deposited thereon. In some embodiments, this may include the presence or absence of surface states on the substrate's surface caused by the treatment of the surface with chemicals before exposition to the precursor staining solution (e.g. HF or other).

In some embodiments, the thickness of the metal layer deposited is in the nanometers (nm) range.

Advantageously, this treatment or process creates surface regions that may distinguished or differentiated using any image acquisition device or system. For example, the differentiated deposited amount will show in optical images (e.g. acquired using an optical microscope), images acquired via a scanning electron microscope (SEM) or any other surface imaging methods known in the art.

Figure 2:
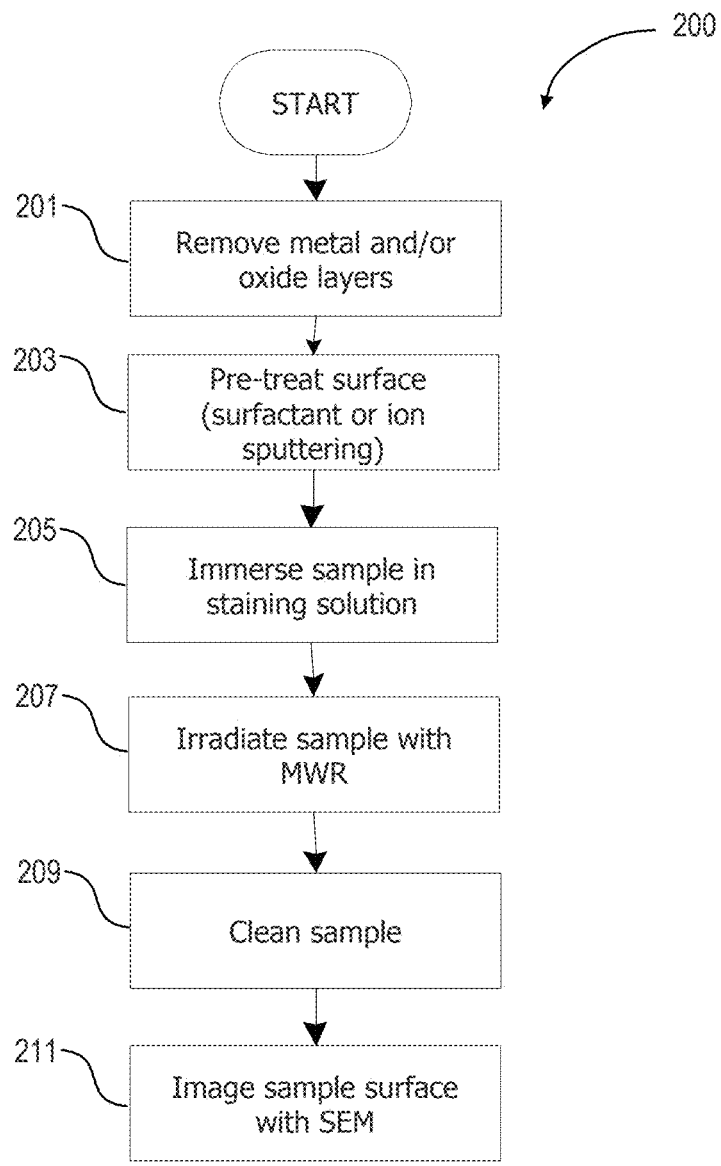
FIG. 2 is a process flow chart of a contrast-enhancing deposition method, in accordance with one embodiment.
Figure 3A:
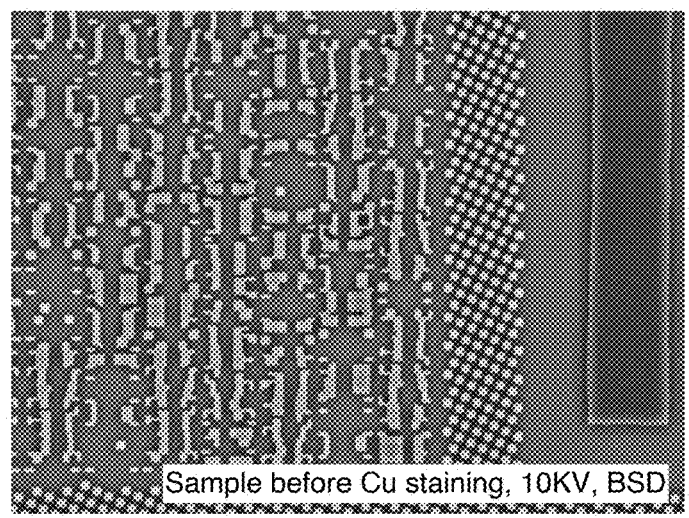
FIGS. 3A to 3C are SEM images of an exemplary substrate surface before Cu staining, in accordance with one embodiment.
Figure 3B:
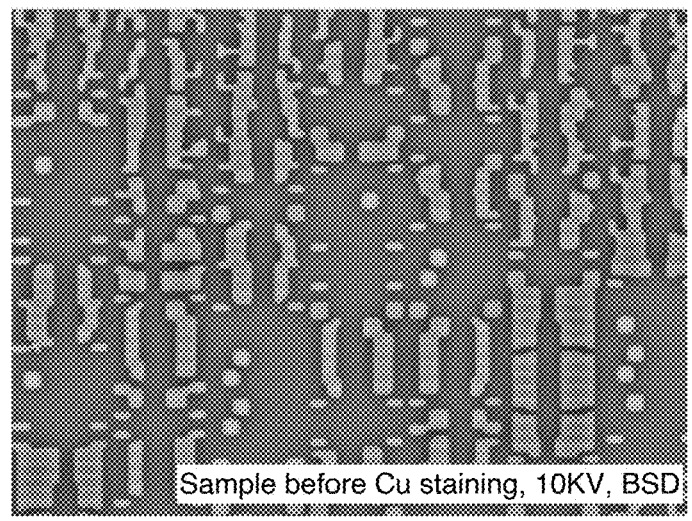
Figure 3C:
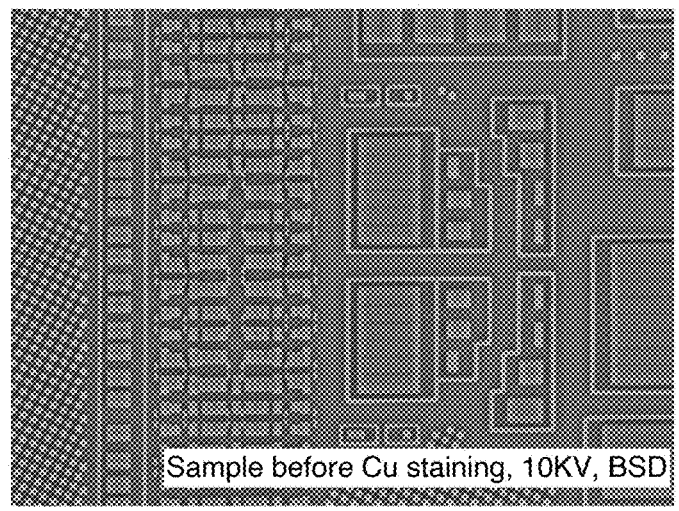

With reference to FIG. 2, and in accordance with one exemplary embodiment, an image contrast-enhancing method for differentially staining different regions of a substrate as a function the charge carrier characteristics of these regions, generally referred to using the numeral 200, will now be described.

Initially, at step 201, a substrate, for example a semiconductor substrate such as a silicon substrate that was taken from a section of a microchip to be reversed engineered, is first treated to remove some or all metal and/or oxide layers that may be present thereon. In one embodiment, to do so, the substrate may be immersed in hydrofluoric acid (HF) for a given length of time. Other means may be used to improve the removal of these layers, as is well known in the art. For example, in some embodiments, a beaker or container containing the sample and the HF solution may be placed in an ultrasonic bath. Once the metallic/oxide layers have been partially or completely removed, the substrate may be washed to remove the HF acid or any delayering solution that might have been used. This may be done, for example, with an appropriate solvent like isopropyl alcohol or similar.

At step 203, in some embodiments, the substrate may optionally be further pre-treated with a surfactant (e.g. glycerol or similar) and/or have its surface cleaned by using ion sputtering.

Thereafter, at step 205, the substrate is immersed in the staining material precursor solution for electroless deposition. As discussed above, different metals may be deposited by exposing the substrate to a precursor solution of metal salts. As discussed above, the solution may comprise a metal salt of the type M$^+$X$^-$ where M is a metal atom and X may be inorganic or organic. In some embodiments, the choice of metal atom may be driven by the relative value of the work function of the substrate with respect to the work function of the metal atom. It is generally understood that when two surfaces are in contact, electrons are usually transferred from the material with the smaller work function to the one with the higher work function (i.e. metal support interaction).

In some embodiments, the solvent used in the preparation of the metal salt solution may comprise water or organic solvents or any combination thereof. The pH of the solution (e.g. acidic, basic or neutral), which has an effect on the deposition rate, may be adjusted, for example by using different compounds such as HF, NH$_4$F, etc. Therefore, the rate of deposition may be controlled by adjusting both the metal salt concentration and the pH of the solution, as is well known in the art.

Moreover, in some embodiments, different organic compounds like polymers may be added to the solution to control the size of the deposited metal particles on the semiconductor substrate. In some embodiments, a small amount of HF may also be added to the solution to prevent the development of different oxides while the solution is in contact with the semiconductor surface. In some embodiments, the substrate may be placed in an open container or dish (Pyrex, plastic or other) and the staining solution may be deposited on it so as to cover the surface of the substrate completely.

At step 207, the substrate and the staining material precursor solution are irradiated with microwave radiation for a designated irradiation time. In some embodiments, the dish or container containing the substrate immersed in the staining precursor solution may be covered with a Petri dish or similar and placed directly, for example, in a microwave oven. As discussed above, different microwave irradiation device or system may be used, without limitation, to expose the substrate and reactants to microwave radiation, including using any system comprising a magnetron microwave generator (MG-A: UM-1500SS-A system; MG-B: UM-1500IS-B system, etc.) and/or semiconductor microwave generator (SG: M2A-R system, etc.).

Once the irradiation step is finished, at step 209 the substrate may be cleaned once more to remove for example the staining precursor solution. This may be done by, for example, immersing the substrate in isopropyl alcohol and drying it with a nitrogen gun.

Finally, once the staining procedure is finished, an image of the enhanced substrate is acquired at step 211. As discussed above, such an image may be acquired via any imaging method which may be sensitive to the differential deposition of staining material, including without limitation, scanning electron microscopy (SEM) (either via measuring backscattered electrons or secondary electrons) or optical microscopy.

Example

The following provides non-limiting examples of a specific embodiments designed and tested to validate, and in some instances, optimize, operation of the above described embodiments. The person skilled in the art will readily appreciate that various features and details of the below-described example may be altered or varied without departing from the general scope and nature of the present disclosure.

Furthermore, while the below examples describe various detailed implementations of systems and methods as described herein, other implementation form factors may be considered, for example, to address larger or smaller scale projects and objectives, and that without departing from the general scope and nature of the present disclosure. Namely, other embodiments may be adapted to accommodate different sample sizes, volumes and/or conditions. These and other such considerations are thus considered to be within the purview of the herein described embodiments as would be readily understood by a person of ordinary skill in the art.

Figure 4A:
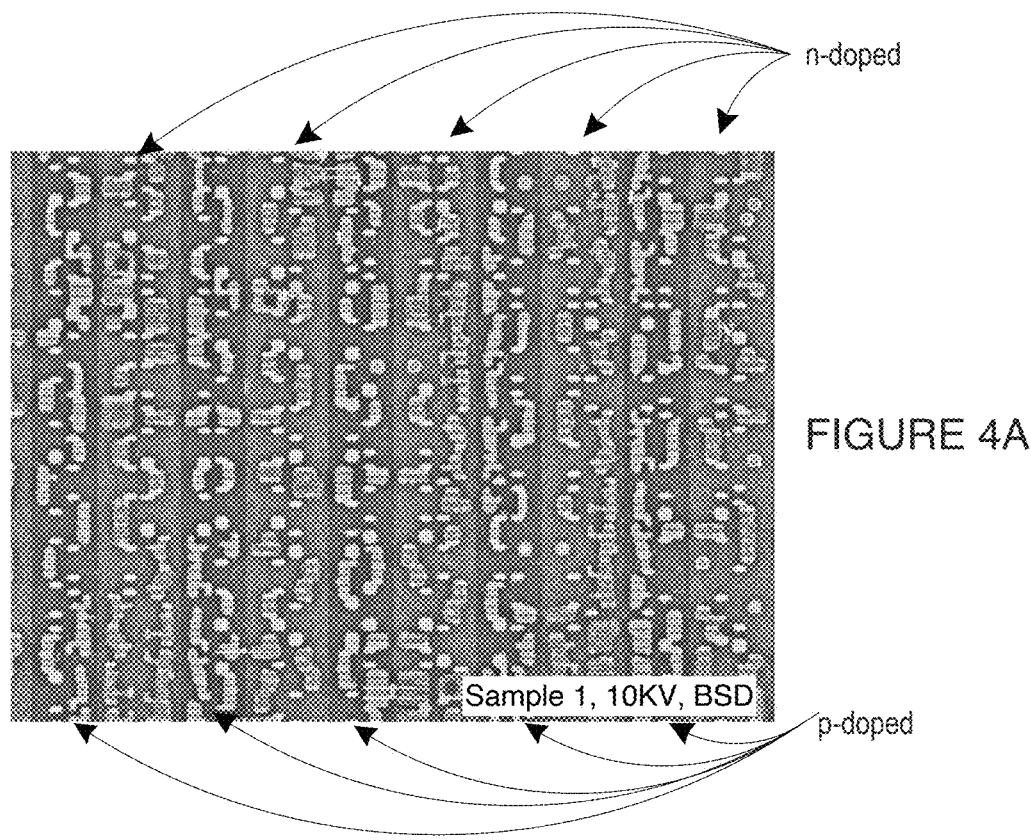
FIGS. 4A and 4B are SEM images of the surface of exemplary Cu-stained sample #1, in accordance with one embodiment.
Figure 4B:
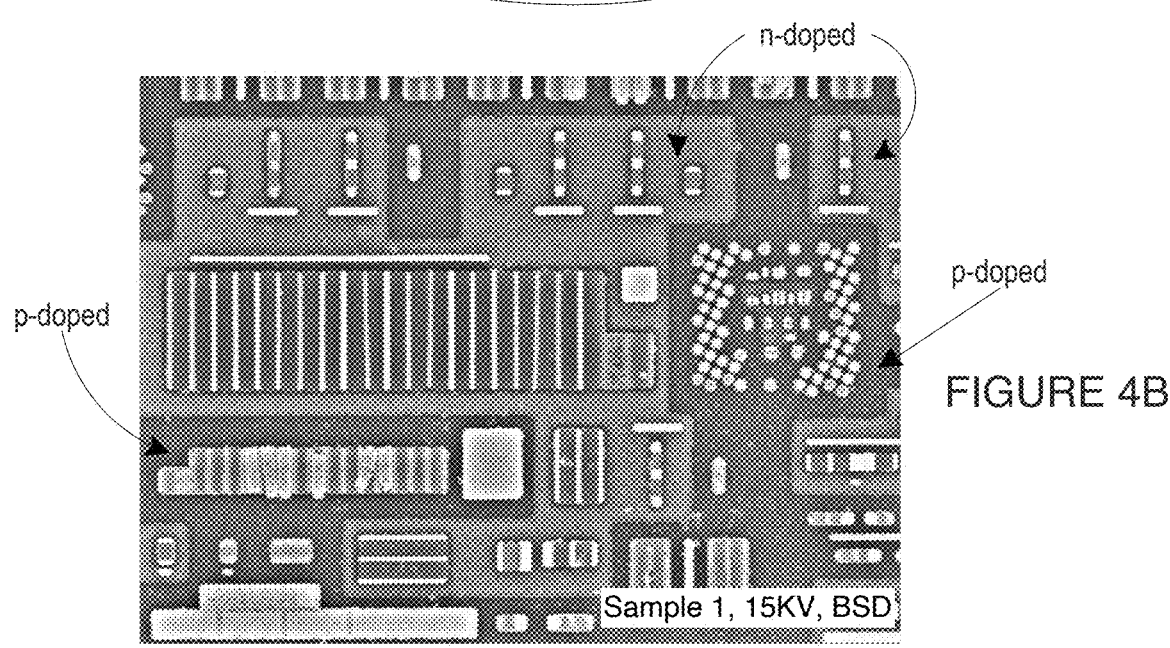
Figure 5A:
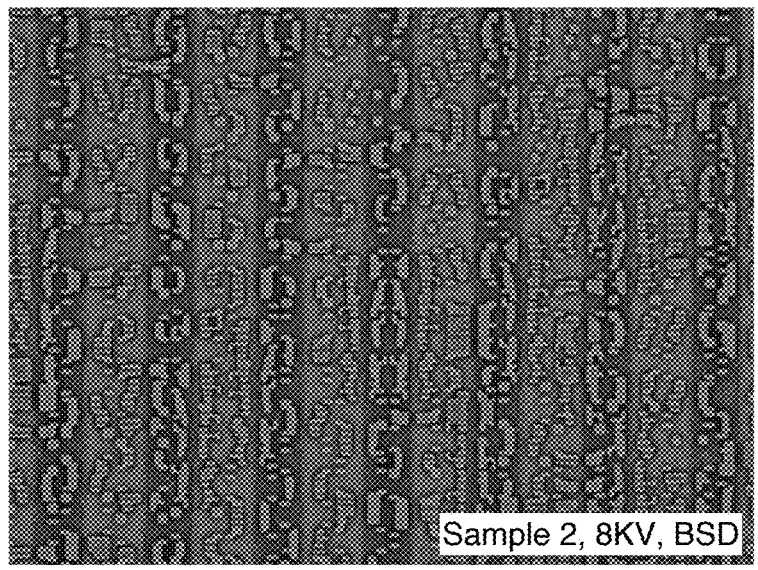
FIGS. 5A and 5B are SEM images of the surface of exemplary Cu-stained sample #2, in accordance with one embodiment.
Figure 5B:
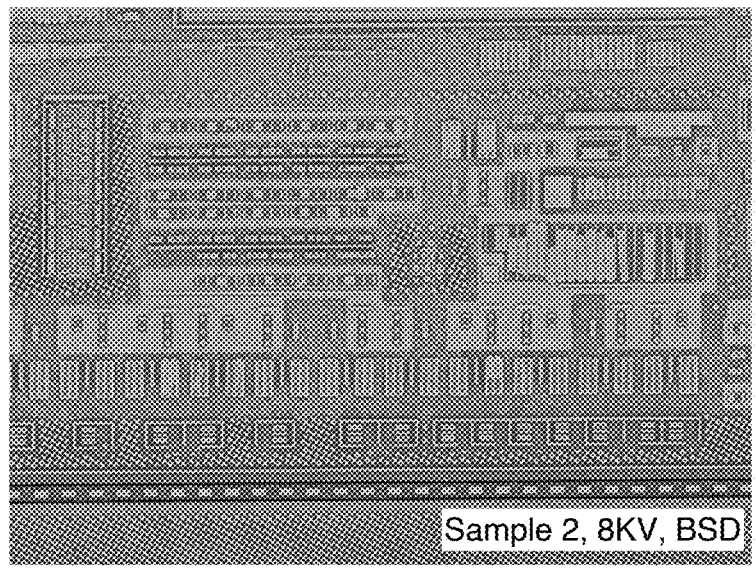
Figure 6A:
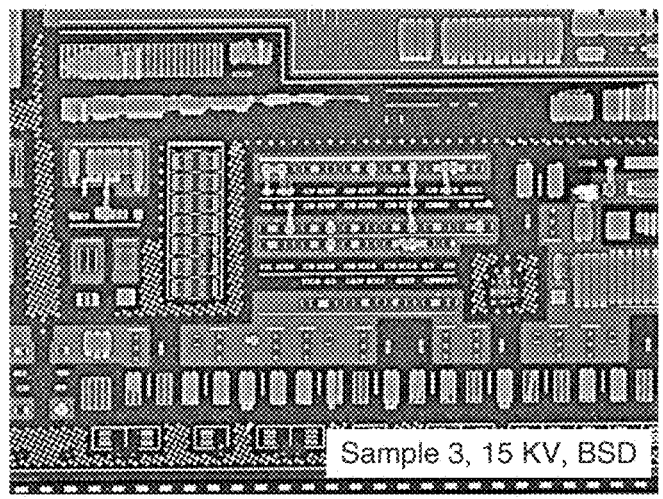
FIGS. 6A to 6C are SEM images of the surface of exemplary Cu-stained sample #3, in accordance with one embodiment.
Figure 6B:
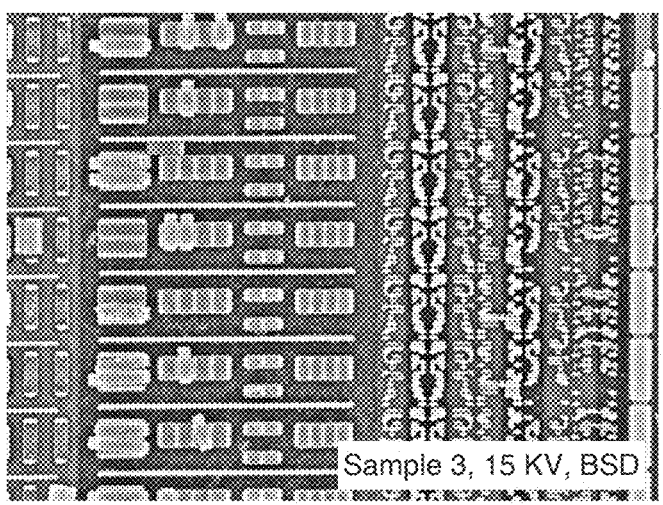
Figure 6C:
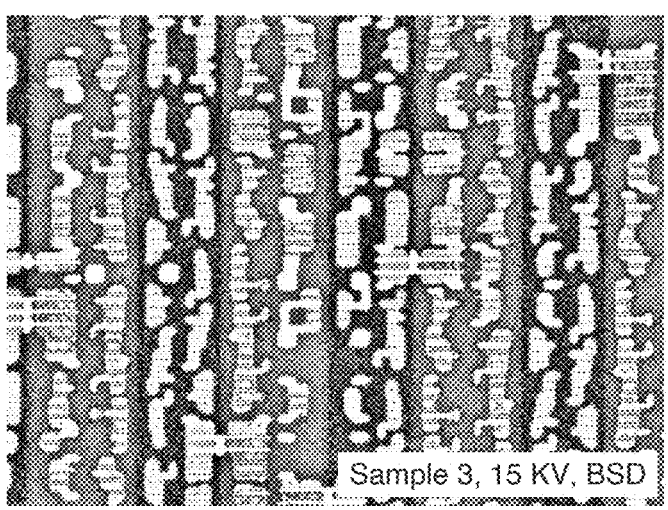
Figure 7A:
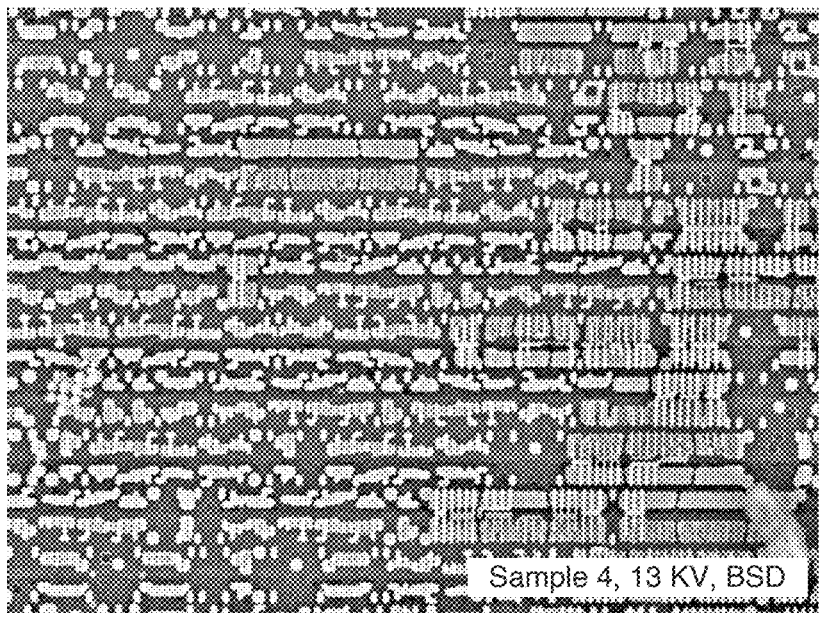
FIGS. 7A and 7B are SEM images of the surface of exemplary Cu-stained sample #4, in accordance with one embodiment.
Figure 7B:
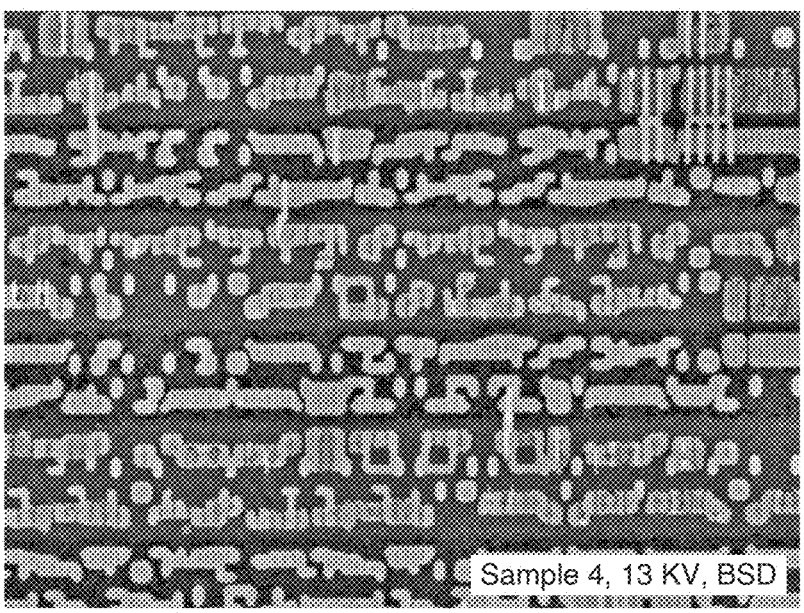
Figure 8:
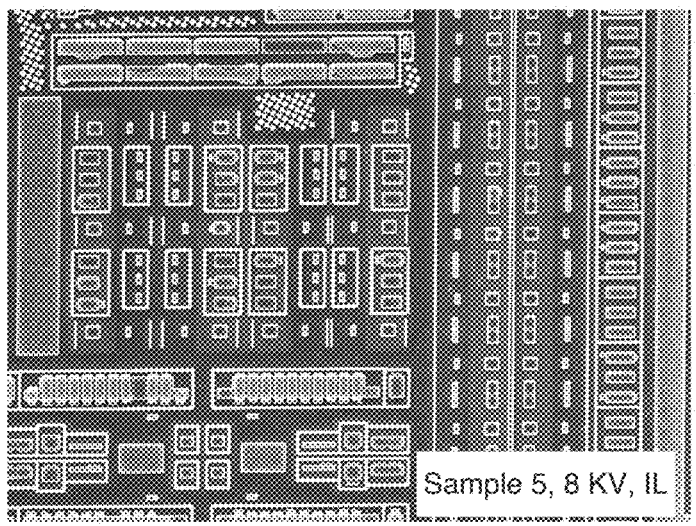
FIG. 8 is a SEM image of the surface of exemplary Cu-stained sample #5, in accordance with one embodiment.
Figure 9A:
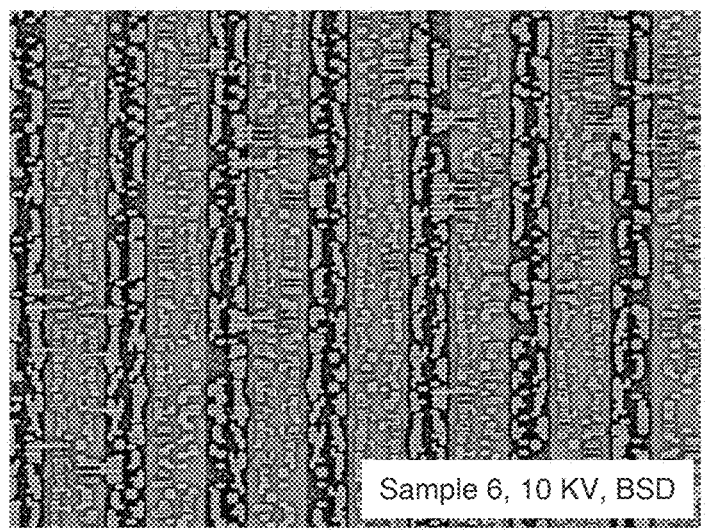
FIGS. 9A and 9B are SEM images of the surface of exemplary Cu-stained sample #6, in accordance with one embodiment.
Figure 9B:
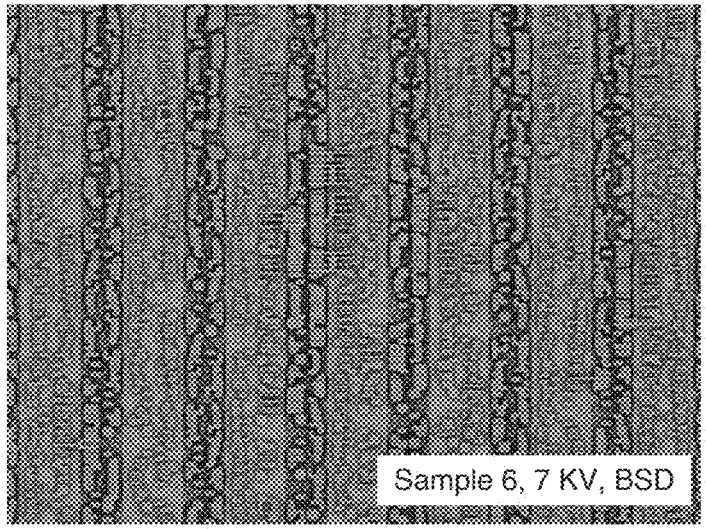
Figure 10:
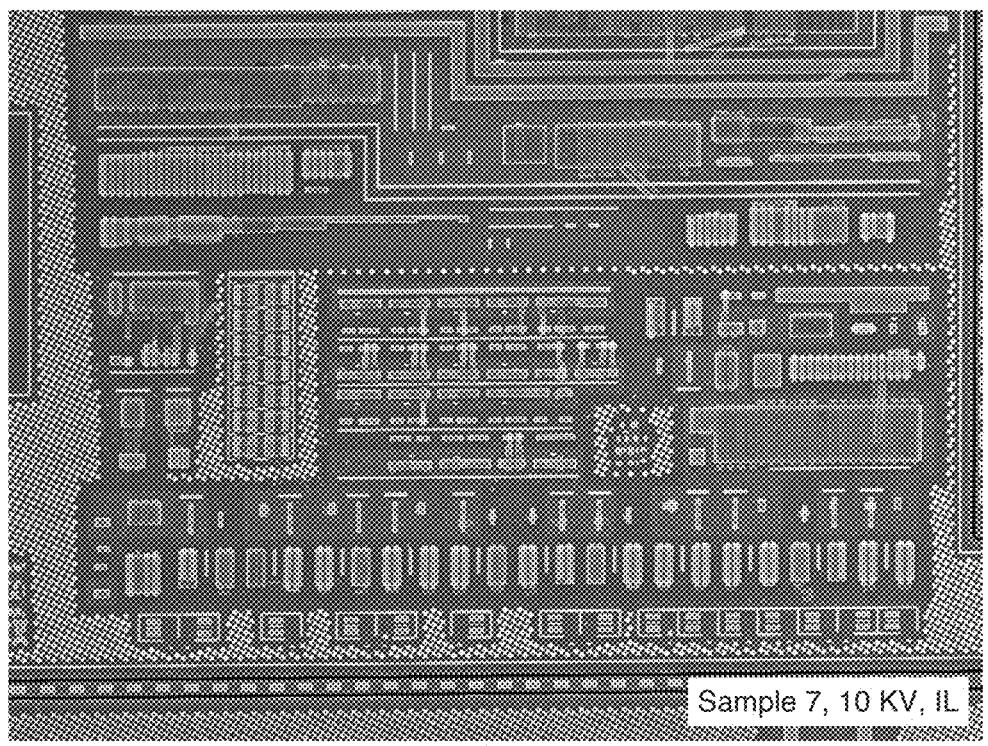
FIG. 10 is a SEM image of the surface of exemplary Cu-stained sample #7, in accordance with one embodiment.
Figure 11A:
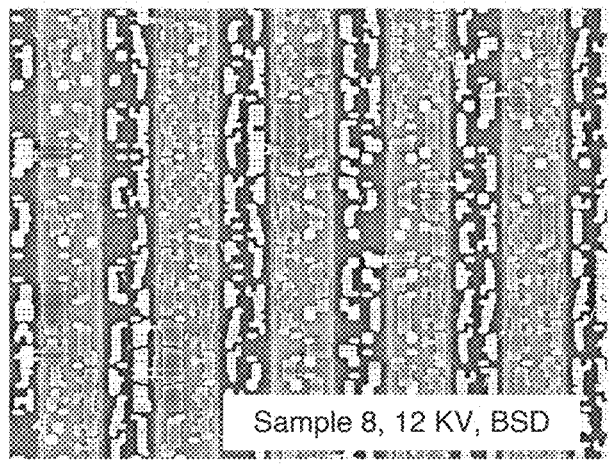
FIGS. 11A to 11C are SEM images of the surface of exemplary Cu-stained sample #8, in accordance with one embodiment.
Figure 11B:
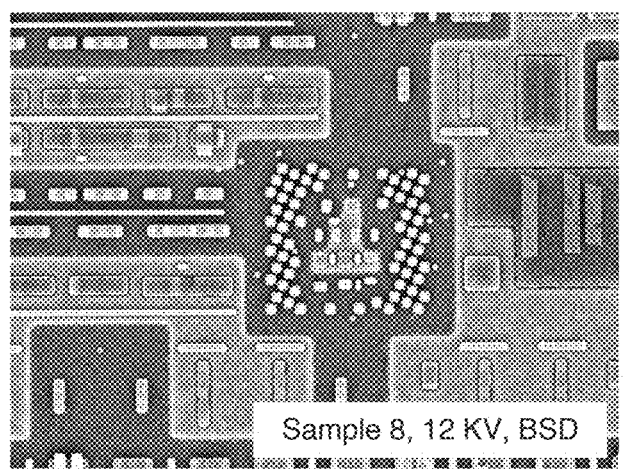
Figure 11C:
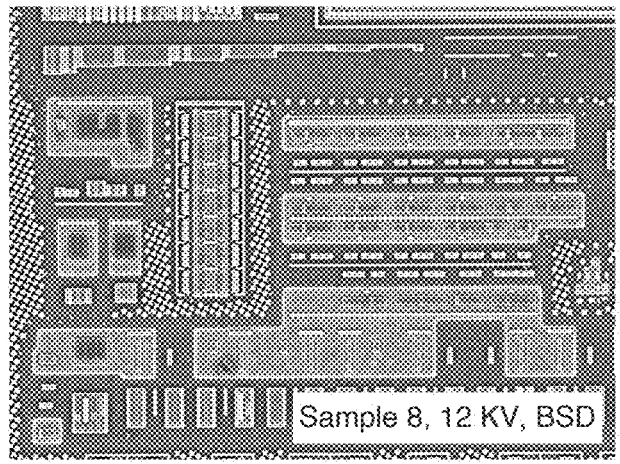
Figure 12A:
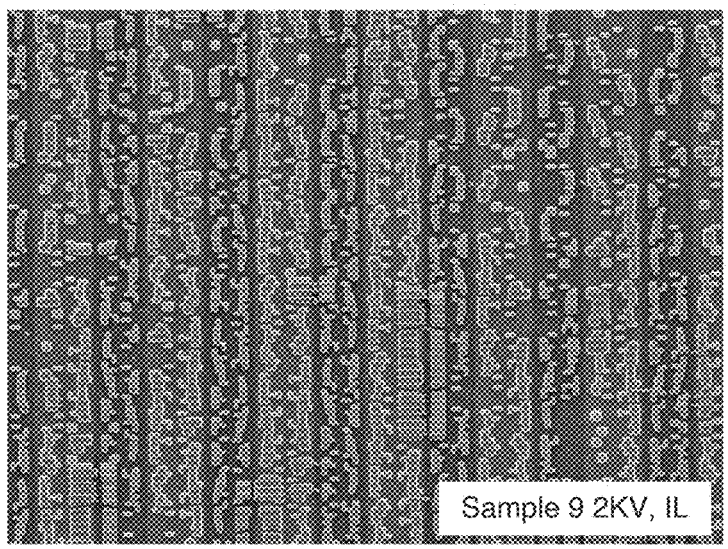
FIGS. 12A and 12B are SEM images of the surface of exemplary Cu-stained sample #9, in accordance with one embodiment.
Figure 12B:
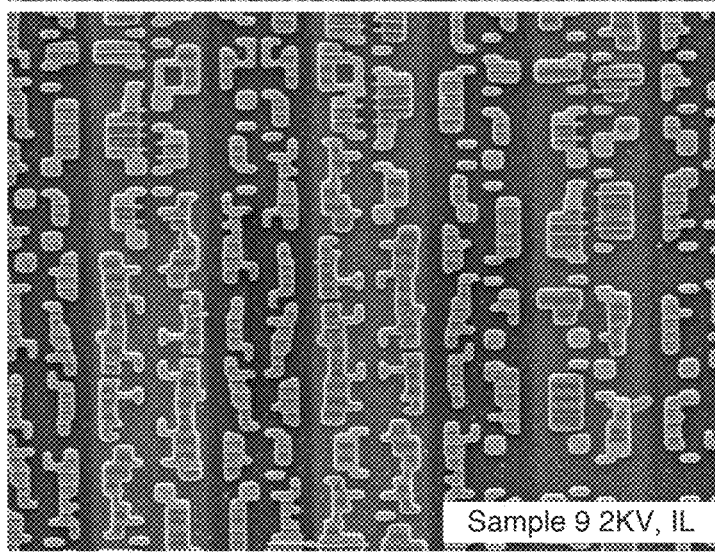
Figure 13:
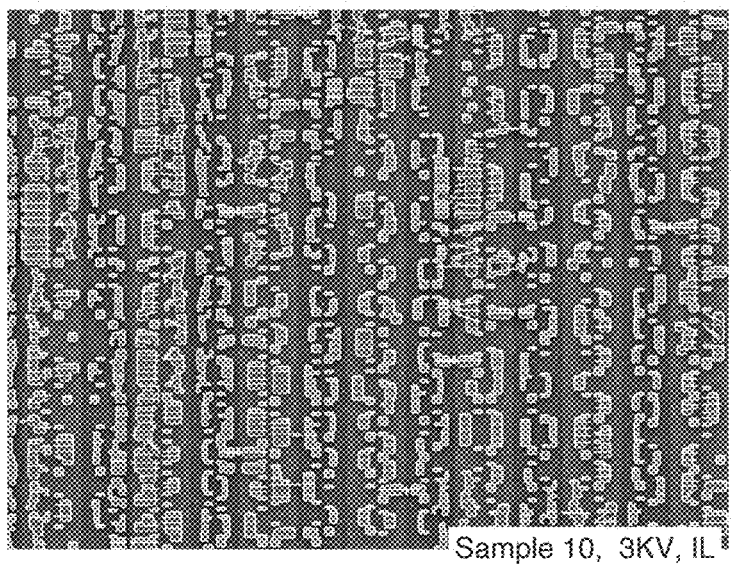
FIG. 13 is a SEM images of the surface of exemplary Cu-stained sample #10, in accordance with one embodiment.

In this example, the chosen staining material is copper which is differentially or preferentially deposited on the n-doped regions of a silicon's substrate surface via MRW-enhanced electroless deposition. As a comparison, scanning electron microscopy (SEM) pre-staining substrate images are shown in FIGS. 4A to 4C (BSE, 10 KV). These show images of an exemplary substrate surface after being submerged in hydrofluoric acid for 4 minutes, and show no contrast between p-doped or n-doped regions. During the MW-assisted deposition process, the copper layer deposited on the surface of the n-regions of the silicon substrate is substantially thicker or larger than the copper layer on the surface of the p-doped regions, thus appearing brighter than p-doped regions when imaged for example via scanning electron microscopy (SEM).

The chemical reaction at the surface of the substrate for this example may be written as:

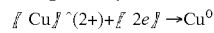

In total, 10 different silicon substrate samples, each taken from an integrated circuit, have been subjected to microwave enhanced electroless deposition of copper, and subsequently imaged using a SEM (BSE or inlens). The following table summarizes the parameters of the precursor solution, microwave irradiation and SEM imaging used for each of these different samples:

TABLE 1

| A/a | Copper Salt | Solvent | Concentration (M*3) | HF (vv %) | MWR Time (s) | SEM method | Imaging Voltage (kV) | Corresponding FIGS. |
|---|---|---|---|---|---|---|---|---|
| 1 | CuSO$_4$5H$_2$O*1 | H$_2$O | 0.02 | 1 | 5 | BSD | 10/15 | 4A/4B |
| 2 | CuSO$_4$5H$_2$O | H$_2$O | 0.02 | 1 | 7 | BSD | 8 | 5A-5B |
| 3 | CuSO$_4$5H$_2$O | H$_2$O | 0.02 | 1 | 10 | BSD | 15 | 6A-6C |
| 4 | CuSO$_4$5H$_2$O | H$_2$O | 0.02 | 1 | 30 | BSD | 13 | 7A-7B |
| 5 | CuSO$_4$5H$_2$O | H$_2$O | 0.008 | 0.25 | 7 | inLens | 8 | 8 |
| 6 | CuSO$_4$5H$_2$O | H$_2$O | 0.008 | 0.25 | 10 | BSD | 7/10 | 9A-9B |
| 7 | Cu(acac)$_2$*2 | H$_2$O | 0.018 | 2 | 5 | inLens | 10 | 10 |
| 8 | Cu(acac)$_2$ | H$_2$O | 0.018 | 2 | 10 | BSD | 12 | 11A-11C |
| 9 | Cu(acac)$_2$ | C$_2$H$_5$OH | 0.018 | 2 | 5 | inLens | 2 | 12A-12C |
| 10 | Cu(acac)$_2$ | C$_2$H$_5$OH | 0.018 | 2 | 10 | inLens | 3 | 13 |

*1 copper sulfate pentahydrate,
*2 copper acetylacetonate,
*3 moles of Cu per 1000 ml of solution In all cases, a small amount of HF 48% was added (% vv: ml of HF reagent in 100 ml of solution) to the precursor solution. All the substrates were irradiated in a consumer-grade microwave oven (2450 MHz, 1100 W).

As mentioned above, the substrates were inspected using an Electron Microscopy. Scanning Electron Microscope (SEM) images of samples 1 to 10 are shown in FIGS. 4A to 11. As indicated in Table 1, the images were obtained using either in Lens or BSD, at relatively similar imaging voltages.

In each figure, we can clearly see that each of the treated substrates show an enhanced contrast between n-doped and p-doped regions, the n-doped regions being lighter than the p-doped regions. In FIGS. 4A and 4B, examples of regions of p-doped or n-doped substrate are indicated. The same contrast is seen for all samples.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A method for enhancing contrast in an image of a substrate surface between regions of said substrate having different charge carrier characteristics, the method comprising:
    exposing said substrate to a staining precursor comprising an oxidant;
    directing microwave electromagnetic radiation at said substrate, said microwave electromagnetic radiation enhancing a reaction rate of said oxidant reacting into a deposition material, said reaction rate being related to the charge carrier characteristics of a proximal region; and
    acquiring an image of said substrate surface indicating a visual contrast between each of said regions based on differential deposition of the deposition material therebetween.

2. The method of claim 1, wherein the charge carrier characteristics comprise one or more of a type of charge carrier, a concentration of charge carrier, or a type of dopant.

3. The method of claim 1, wherein said reaction is a reduction reaction.

4. The method of claim 3, wherein said deposition material is a metallic material and said staining precursor is a metal salt solution, said metal salt solution comprising at least one solvent and a concentration of cations of said metallic material.

5. The method of claim 4, wherein said solvent comprises at least in part water.

6. The method of claim 4, wherein said solvent comprises at least in part an organic solvent.

7. The method of claim 4, wherein said metallic material is copper, silver, gold, aluminum, platinum, lead, palladium, zinc, nickel, or iron.

8. The method of claim 1, wherein said substrate is a semiconductor substrate.

9. The method of claim 8, wherein said semiconductor substrate is a silicon substrate.

10. The method of claim 8, wherein said semiconductor substrate is a compound semiconductor substrate.

11. The method of claim 10, wherein said compound semiconductor substrate is GaAs, InAs, or InP.

12. The method of claim 1, wherein said acquiring is performed with a scanning electron microscope (SEM).

13. The method of claim 1, wherein said acquiring is performed with an optical microscope.

14. An image acquisition system for acquiring an image of an semiconductor substrate showing enhanced contrast between two or more regions of said substrate having different charge carrier characteristics, the system comprising:
    a staining material source configured to provide a staining precursor comprising an oxidant for contacting a surface of said substrate;
    a microwave electromagnetic radiation source configured to direct microwave electromagnetic radiation at the semiconductor substrate, said microwave electromagnetic radiation enhancing a reaction rate of said oxidant reacting into a deposition material, said reaction rate being related to the charge carrier characteristics of a proximal region; and
    an image acquisition device sensitive to an amount of said staining precursor and configured to acquire an image of the substrate.

15. The image acquisition system of claim 14, wherein the charge carrier characteristics comprise one or more of a type of charge carrier, a concentration of charge carrier, or a type of dopant.

16. The image acquisition system of claim 14, wherein said reaction is a reduction reaction.

17. The image acquisition system of claim 16, wherein said deposition material is a metallic material and said staining precursor comprises a metal salt solution, said metal salt solution comprising at least one solvent and a concentration of cations of said metallic material.

18. The image acquisition system of claim 17, wherein said solvent comprises at least in part water.

19. The image acquisition system of claim 17, wherein said solvent comprises at least in part an organic solvent.

20. The image acquisition system of claim 17, wherein said metallic material comprises copper, silver, gold, aluminum, platinum, lead, palladium, zinc, nickel, or iron.

21. The image acquisition system of claim 14, wherein said substrate is a semiconductor substrate.

22. The image acquisition system of claim 21, wherein said semiconductor substrate is a silicon substrate.

23. The image acquisition system of claim 21, wherein said semiconductor substrate is a compound semiconductor substrate.

24. The image acquisition system of claim 23, wherein said compound semiconductor substrate is GaAs, InAs, or InP.

25. The image acquisition system of claim 14, wherein said image acquisition device is a scanning electron microscope (SEM).

26. The image acquisition system of claim 14, wherein said image acquisition device is an optical microscope.

\* \* \* \* \*